United States Patent [19]

Boyhan

[11] Patent Number: 5,558,895
[45] Date of Patent: Sep. 24, 1996

[54] MOLDING PROCESS AND APPARATUS

[75] Inventor: Laurence A. Boyhan, Lower Templestowe, Australia

[73] Assignee: Gradual Pty Ltd., Melbourne, Australia

[21] Appl. No.: 290,716

[22] PCT Filed: Feb. 15, 1993

[86] PCT No.: PCT/AU93/00061

§ 371 Date: Aug. 12, 1994

§ 102(e) Date: Aug. 12, 1994

[87] PCT Pub. No.: WO93/15613

PCT Pub. Date: Aug. 19, 1993

[51] Int. Cl.$^6$ .................................................. A23G 1/21
[52] U.S. Cl. ..................... 426/515; 426/512; 426/660; 425/DIG. 112; 425/417; 264/DIG. 44; 264/313; 264/330
[58] Field of Search ................................ 426/512, 515, 426/660; 425/DIG. 112, 417, 422, 398; 264/313, DIG. 44, 330, 334

[56] References Cited

U.S. PATENT DOCUMENTS

| | | | |
|---|---|---|---|
| 4,076,207 | 2/1978 | Austin | 249/66 R |
| 4,778,683 | 10/1988 | Newsteder | 426/515 |
| 4,873,044 | 10/1989 | Epel | 425/417 |
| 4,919,608 | 4/1990 | Catalanotti et al. | 425/556 |
| 4,946,696 | 8/1990 | Nendl et al. | 426/512 |
| 5,087,193 | 2/1992 | Herbert, Jr. | 425/543 |
| 5,370,888 | 12/1994 | Hachiya et al. | 426/512 |

FOREIGN PATENT DOCUMENTS

| | | |
|---|---|---|
| 52703/86 | 4/1987 | Australia . |
| 71526/87 | 10/1987 | Australia . |
| 242059 | 10/1987 | European Pat. Off. . |
| 318595 | 1/1989 | European Pat. Off. . |
| 299113 | 1/1989 | European Pat. Off. . |
| 395756 | 11/1990 | European Pat. Off. . |
| 2665393 | 2/1992 | France . |
| 461966 | 6/1928 | Germany . |
| 365439 | 2/1932 | United Kingdom . |
| 2157616 | 10/1985 | United Kingdom . |

OTHER PUBLICATIONS

Derwent Abstract Accession No. 88–122058, Class A32, JP, A,63–064713 (Mizushima Kagaku Kogyo KK) Mar. 23, 1988) Abstract.
Derwent Abstract Accession No. 90–250652, Class A97, JP,A.02–174636 (Mitsui Toatsu Chem Inc.) (Jul. 6, 1990) Abstract.
Derwent Abstract Accession No. 90–805170, Class D14, JP, A, 01–289474 (Asahi Denka Kogyo Kabushiki kaish) (Nov. 321, 1989) Abstract.
Derwent Abstract Accession No. 86–194578, Class D13, JP, A, 61–128840 (Shinno) (Jun. 16, 1986), Abstract.
Derwent Abstract Accession No. 92–246433, Class P13, JP, A, 04–166306 (Okamoto Ind Inc.) 12 Jun. 1992 (Jun. 12, 1992) Abstract.

*Primary Examiner*—Esther M. Kepplinger
*Assistant Examiner*—Lien Tran
*Attorney, Agent, or Firm*—Merchant, Gould, Smith, Edell, Welter & Schmidt

[57] ABSTRACT

A process and apparatus is provided for molding flowable materials. The mold may be provided with deformable or collapsible mold surfaces and a forming member which is positioned in the mold when producing a shell molded article is also deformable or collapsible. After the molded article is formed the forming member and/or the mold surfaces are deformed or collapsed to facilitate removal of the article from the mold and to avoid "backlocking" of the article in the mold.

8 Claims, 5 Drawing Sheets

MOLDING PROCESS AND APPARATUS

MOLDING PROCESS AND APPARATUS

This invention relates to a process and apparatus for molding articles.

In a principal but not exclusive aspect, the invention relates to a process and apparatus for manufacturing a shell of material in a mold.

BACKGROUND OF THE INVENTION

1. Field of the Invention

The invention is particularly, but not exclusively, concerned with a manufacturing process and apparatus involving the molding of a shell of confectionery material. The molded shell may, or may not, be subsequently filled with other material, usually confectionery material and that subsequent filling step may be included within the broadest scope of one of the aspects of the invention.

This manufacturing process will be referred to hereinafter as "shell molding", and, is so known by those skilled in this Art.

For the purposes of this specification the term "confectionery material" when used herein refers to any edible foodstuff which contains sugar and/or artificial sweetening material.

2. Description of the Prior Art

There are a number of problems and deficiencies associated with the current process for shell molding of material, and, in one particular instance, when the material to be molded is confectionery.

When the material to be molded is confectionery, it is very difficult, if not practically impossible, to predetermine the wall thickness, or thicknesses if a variety of wall thicknesses are desired, of the molded confectionery article and produce an article having that predetermined thickness or those thicknesses, using currently known processes. This is so, even with the simplest of shapes. For more complex shapes the difficulties in producing a shell of material having controlled wall thickness, and such articles represent acceptable and economically desirable articles, increase greatly, Accordingly, it is not currently possible to keep wall thicknesses in a shell molded article relatively thin and uniform in the case of simple shapes, that is, as thin as the inherent properties of the material would allow, or, to produce articles having controlled wall thicknesses in predetermined areas of the article, as may be desirable in the case of articles having complex shapes.

However, it is desirable for some simple shapes, to be able to control and predetermine the wall thickness when shell molding an article, and, it is of great benefit if the wall thickness of the article can be made uniform throughout. For other articles it is desirable to be able to control and predetermine the wall thickness so that, for example, additional strength can be provided to one or more parts of the article by the provision of a thicker wall in that area or areas.

Also, when considering the problems associated with molding more complex shapes generally, there is often a problem with "backlocking" of the article in the mold, which is caused by one or more protrusions of such an article not being able to freely move past other portions of the mold, and thus "locking" the article in the mold.

Also, as will be appreciated by those skilled in the molding art, there are many instances where effective demolding of an article to release it from a mold requires that the material from which the article is molded contracts slightly when it solidifies. However, there are some occasions when the molding material is such that there is no contraction, or virtually no contraction, of the material on solidification. In such cases acceptable demolding of an article from a solid mold is extremely difficult, or impossible.

It is also possible that difficulties may be encountered when filling a shell-molded article with other material, if the addition of that other material causes the filled article to remain in the mold, under normal mold release action, that is, the shell of material sticks to the mold after the filling step. This could occur where the filling step alters the characteristics of the shell-molded material and that alteration relates to the mold release capabilities of the material. It is also possible that the nature of the filling material may require a shell-molded material of less favourable mold release character to be used, as indicated in the preceding paragraph.

It is an object of the present invention to provide a process and apparatus for the manufacture of a shell molded article, in which the wall thickness achieved, in at least a substantial part of the article, is able to be predetermined.

It is also an object of the present invention to provide a process and apparatus for the manufacture of a molded article, in which the article may be readily removed from the mold, due to removal of a substantial portion of the mold surfaces from said article, prior to removal.

SUMMARY OF THE INVENTION

In one aspect of the invention there is provided a process for producing a shell molded article, said process including the following steps: introducing sufficient liquid material to form the article into a molding cavity of an open mold; locating a deformable or collapsible forming member in said molding cavity which displaces said liquid material around said molding cavity; said deformable or collapsible forming member being such that the surfaces of the forming member are spaced from the walls of the mold cavity in a predetermined manner; solidifying the liquid material; deforming or collapsing the forming member and, removing said deformed or collapsed forming member from said molding cavity.

In another aspect of the invention there is provided a process for producing a molded article, said process including the following steps: introducing sufficient liquid material to form the article into a molding cavity of an open mold; the mold surfaces of said molding cavity being deformable or collapsible; optionally locating a forming member in said molding cavity which displaces said liquid material around said molding cavity; said forming member being such that, if present, the surfaces thereof are spaced from the surfaces of the molding cavity in a predetermined manner; solidifying the liquid material; if present, removing the forming member from said molding cavity; deforming or collapsing the mold surfaces away from the exterior surface of said molded article, whereby to allow the molded article to be removed through the opening of said mold.

In one embodiment of said another aspect of the invention, a forming member is employed, and is deformable or collapsible. It is deformed or collapsed before its removal from the molding cavity.

In yet another aspect of the invention there is provided an apparatus for producing a shell molded article, including; a mold, having an opening and a molding cavity; means to introduce sufficient liquid material to produce the article into said molding cavity; means to introduce a deformable or collapsible forming member into said molding cavity; means to position the surfaces of the forming member in a predetermined manner in relationship with the walls of the molding cavity; means to deform said forming member after said material has solidified; and, means to remove said deformed or collapsed forming member from said molding cavity.

In a further aspect of the invention there is provided an apparatus for molding an article, including, a mold, having an opening and a molding cavity, the mold surfaces of which are deformable or collapsible; means to introduce sufficient liquid material to produce the article into said molding cavity; optional means to locate a forming member in said molding cavity and means to position the surfaces thereof in a predetermined manner in relationship with the mold surfaces; means to remove the forming member, if present; means to deform or collapse said mold surfaces away from the exterior surfaces of said molded article to allow the molded article to be removed through said opening in said mold.

In one embodiment of said further aspect of the invention a forming member is present, and is deformable or collapsible. It is deformed or collapsed before its removal from the molding cavity.

In yet a further aspect of the invention the apparatus includes both mold surfaces and a forming member which are deformable or collapsible.

In a still further aspect of the invention there is provided an apparatus for producing a filled shell molded article, including; means to form a shell molded article or to locate one in a molding cavity of an open mold, the mold surfaces of said molding cavity being deformable or collapsible; means to introduce a filling material into said shell molded article; means to deform or collapse the surfaces of said molding cavity away from the exterior surface of the filled article, to allow the filled article to be removed through the opening in the mold.

In one aspect of the invention the forming member deforms or collapses in such a way to reduce its volume.

In another aspect of the invention the forming member deforms or collapses without reducing its volume.

In yet another aspect of the invention, all of the forming member and the mold surfaces separate from the solidified material during the deforming or collapsing step.

In a further aspect of the invention the forming member and the mold surfaces are resiliently deformable or collapsible.

In yet a further aspect of the invention the forming member is hollow and is collapsed by providing a partial vacuum to the interior thereof.

In yet another aspect of the invention the mold surfaces are deformed or collapsed, by applying a partial vacuum behind the mold surfaces.

In a still further aspect of the process of the invention the liquid material is confectionery, and is in a heated condition; it is solidified by allowing it to cool, or, by cooling it as a separate step in the process.

In yet a further aspect of the invention the mold is open at the top.

In yet a still further aspect of the invention a plurality of molding cavities are provided in the mold, each being associated with a respective forming member.

BRIEF DESCRIPTION OF THE DRAWINGS

The invention will now be described with reference to preferred embodiments of the process and apparatus thereof, and, with reference to the accompanying drawings in which.

DESCRIPTION OF THE PREFERRED EMBODIMENTS

Figure 1:
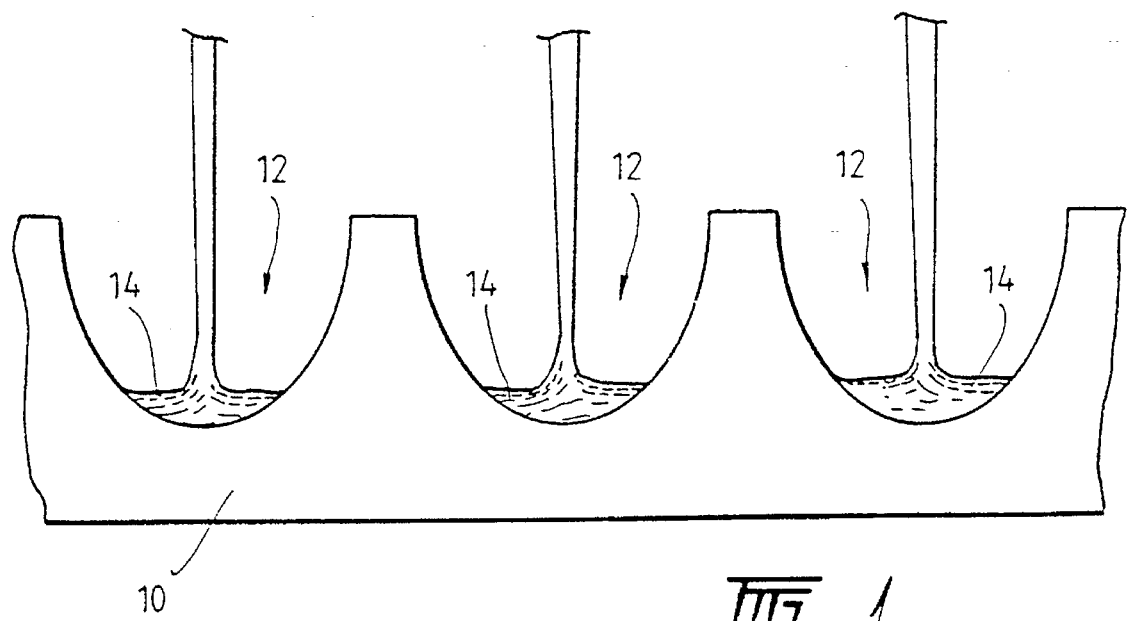
FIGS. 1 to 5 show in schematic form the steps of a first embodiment of the shell molding of an article of confectionery.

Referring to the drawings and to FIGS. 1 to 5, FIG. 1 in particular, there is seen a mold tray 10 containing a plurality of molding cavities 12. Liquid confectionery mixture 14, in this case molten chocolate, is introduced into each mold cavity 12 in a measured amount, by conventionally known means.

Figure 2:
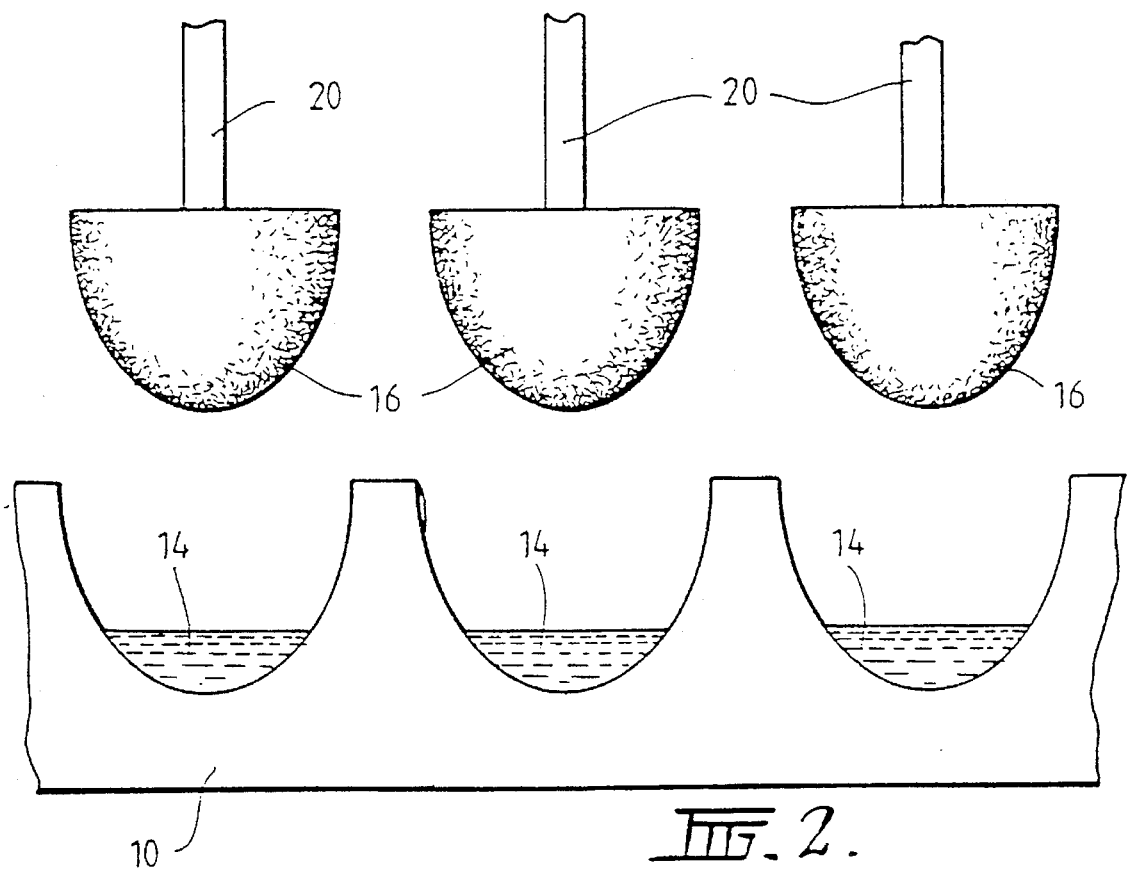

As shown in FIG. 2 forming members 16 are provided. Each forming member 16 is deformable and is hollow, being formed from a resilient material, such as a synthetic rubber or synthetic rubber containing composition. The hollow interior 18 (seen in FIG. 3) of each forming member 16 is connected to a vacuum pump by conduits 20.

Figure 3:
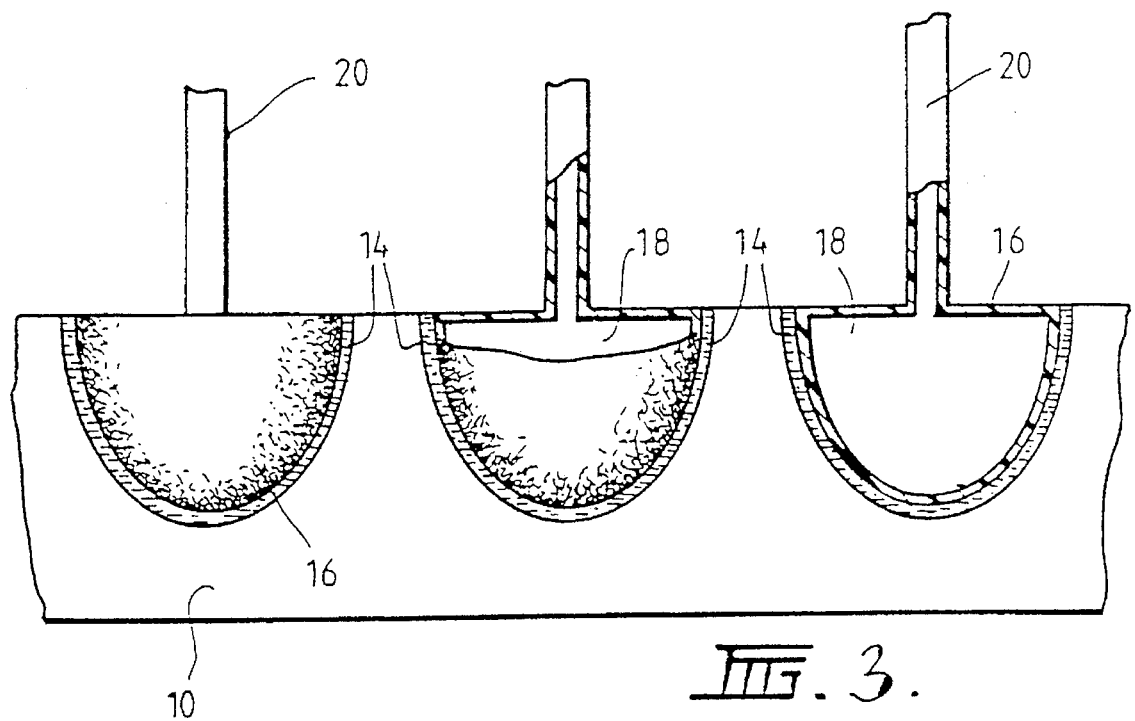

FIG. 3 shows the location of each forming member 16 into the respective molding cavity 12, which displaces molten chocolate 14 around molding cavities 12. Forming members 16 are of such configuration that the surfaces thereof are spaced from the surfaces of the molding cavities 12 in a predetermined manner, which as can be seen from the drawing, produces a uniform spacing occupied by molten chocolate 14.

Figure 4:
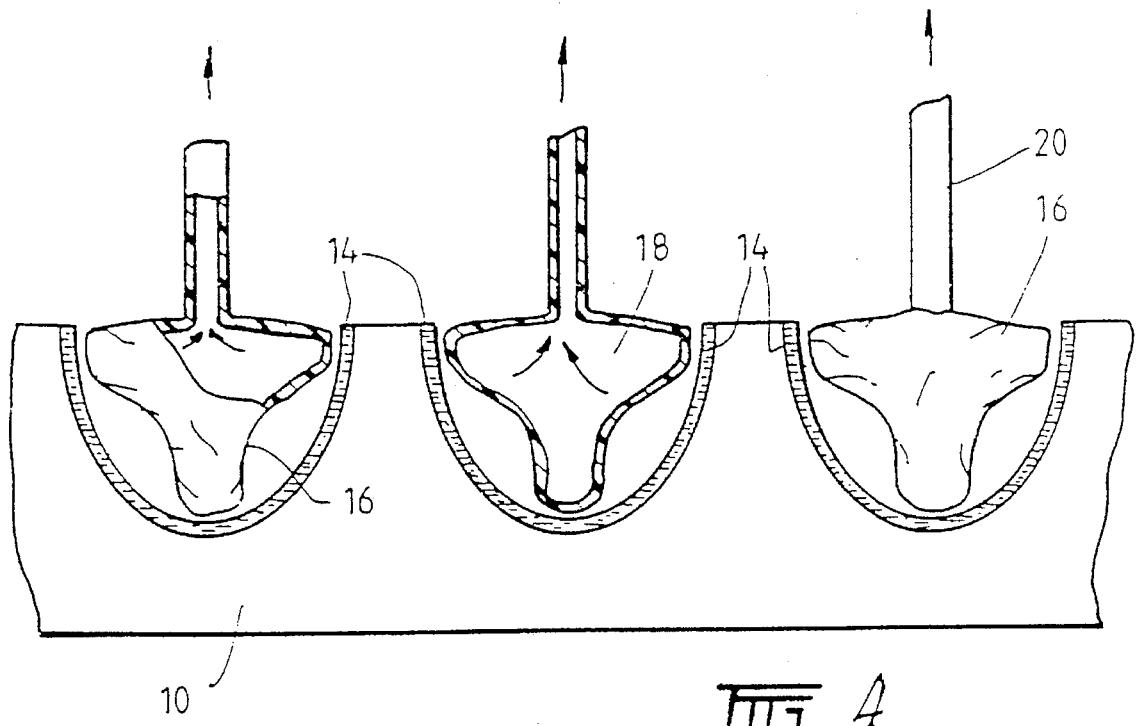

After molten chocolate 14 has solidified, by cooling, a reduced air pressure is induced in the hollow interiors 18 of forming members 16 by removing air therefrom through conduits 20. As the air pressure decreases, forming members 16 collapse as seen in FIG. 4 so that, initially, at least a portion of forming members 16 separate from the solidified chocolate 14. As the air pressure in the hollow interior 18 reduces further, more of forming members 16 are separated from the solidified chocolate shell 14, until forming members 16 no longer contact the solidified chocolate shell 14.

Figure 5:
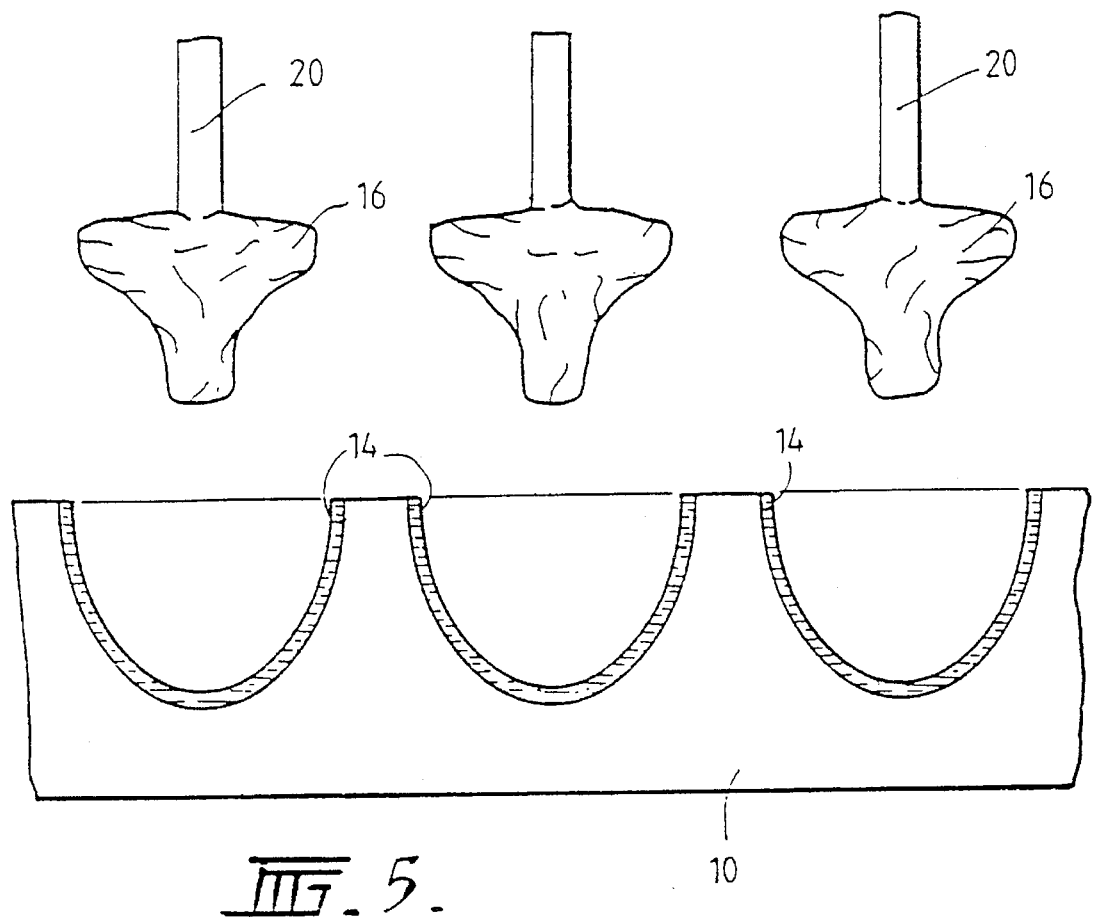

At this stage the now collapsed forming members 16, having substantially reduced their volume, are able to be readily withdrawn from molding cavity 12, and as clearly seen in FIG. 5 leave a uniformly walled, shell molded chocolate article, which can be subsequently removed from the molding cavities 12 by known techniques.

Figure 6:
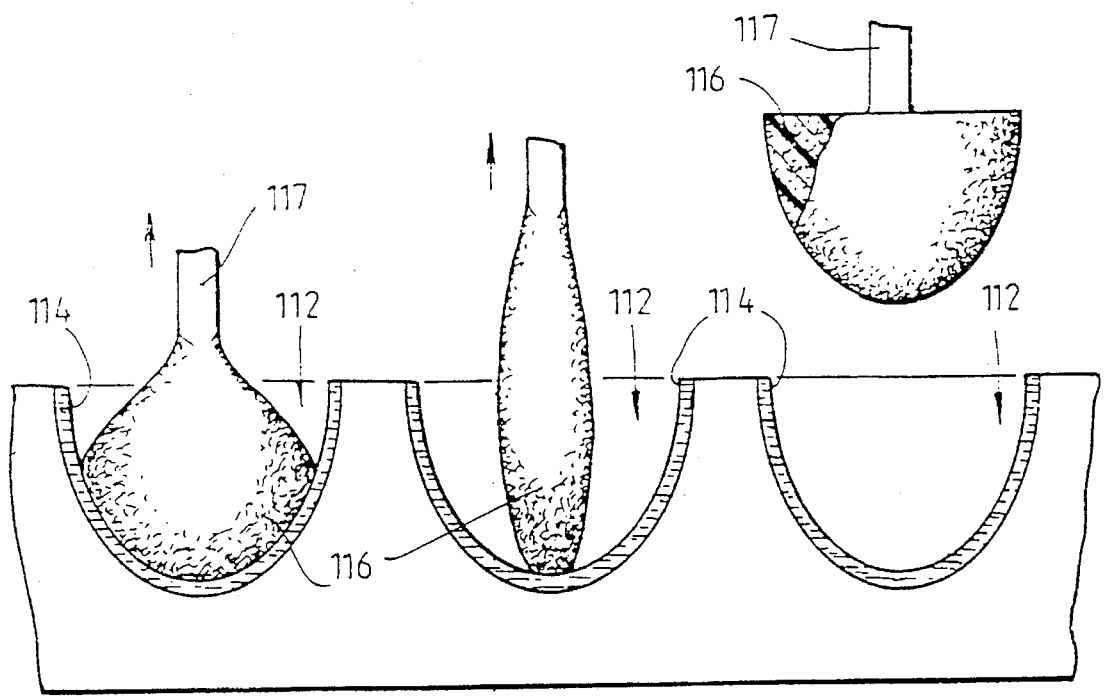
FIG. 6 shows in schematic form, removal of a forming member from a molding cavity, in another embodiment of the invention shown in FIGS. 1 to 5, where a deformable former is employed, rather than a collapsible one.

Referring now to FIG. 6 there is shown the use of a forming member 116 which is not hollow but is formed of a resiliently deformable material, such as polyurethane foam, which would preferably have a coating thereon. The coating would be suitable for use with the material to be molded.

The figure on the left hand side of FIG. 6 corresponds to FIG. 4 where the solidified chocolate 114 is ready to be removed from molding cavities 112. In this embodiment each forming member 116 is attached to a rod 117 which is drawn away from molding cavities 112 and produces deformation of forming member 116 commencing at the peripheral edge, at the top of molding cavities 112.

As seen in the middle drawing of FIG. 6, rod 117 has continued to move away from molding cavities 112 so that the deformation of forming member 116 continues, and it continues to be removed or "peeled", from the solidified chocolate shell 114.

In the drawing on the right hand side of FIG. 6 there is shown the forming member 116 now fully removed from the solidified chocolate 114 and, under the influence of its resilient characteristic, has resumed its original shape. A solidified chocolate shell 114 may now be removed from molding cavity 112 by conventional means.

Figure 7:
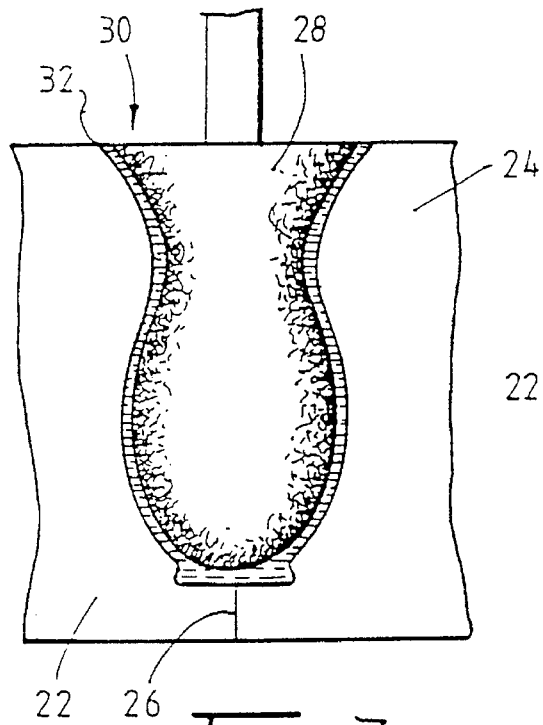
FIGS. 7 and 8 show a further embodiment of the invention in which a complex shape is shell molded and the wall thickness of the article is not constant.
Figure 8:
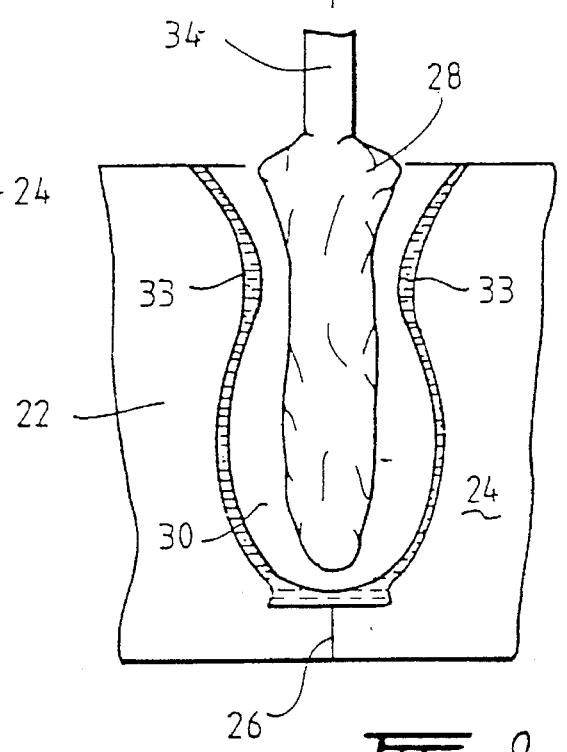

Referring now to FIGS. 7 and 8 there is shown a two part mold formed of parts 22 and 24, which come together along line 26.

In the same way as described above, an amount of liquid confectionery mixture, again, reference will be had to molten chocolate, is provided in the bottom of the mold and a collapsible forming member, collapsed as shown in FIG. 8, is inserted into the mold and allowed to resume its normal shape, as shown in FIG. 7. Again, the forming member displaces liquid chocolate around the molding cavity 30 and is positioned in molding cavity 30 in a predetermined manner. Upon solidification of the molten chocolate there is formed an article 32 in molding cavity 30.

As will be seen from FIGS. 7 and 8 the configuration of collapsible forming member 28 is such that the walls of article 32 are thicker in the neck region 33, of the article, whereby to provide additional strength to the article in that region.

To remove article 32 from the two mold halves 22 and 24, the hollow interior 32 of collapsible forming member 28 has the air pressure therein reduced by connection to a vacuum pump via conduit 34. When collapsible forming member 28 reaches a collapsed configuration as seen in FIG. 8, it may be readily removed from molding cavity 30. The mold is then opened, either by hinging about line 26 or removal of one mold part 22 from the other mold part 24, so that article 32 may be obtained.

Figure 9:
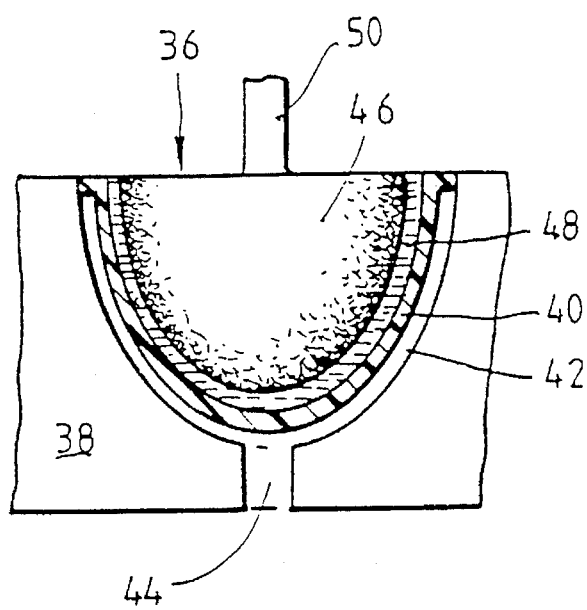
FIGS. 9 and 10 show a still further embodiment of the invention in which the mold surfaces are deformable or collapsible to ensure the release of a shell molded article from the mold surfaces.
Figure 10:
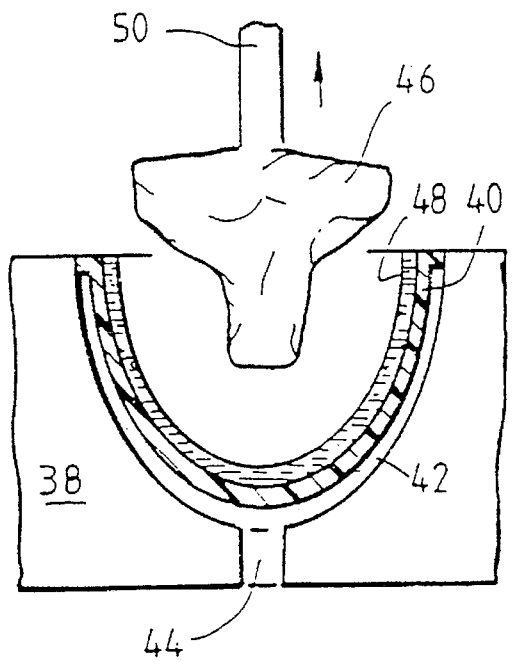

Referring now to FIGS. 9–12 there is shown a further embodiment of the invention and with reference to FIGS. 9 and 10 particularly, there is seen a single molding cavity 36 in a mold tray 38, in which the mold surfaces 40 are deformable or collapsible.

Behind mold surfaces 40 there is provided a space 42 connected to a passageway 44.

FIG. 9 represents the same stage in manufacture of a shell molded article as represented by FIG. 3. Again, a molten chocolate material has been introduced into mold cavity 36 and has been displaced by the insertion of forming member 46 around mold surfaces 40. When solidified this has produced a shell of solid chocolate 48.

Forming member 46 is again hollow and to remove forming member 46 from molding cavity 36, air is evacuated from the hollow interior of forming member 46 via conduit 50. As seen in FIG. 10 removal of air from the interior of forming member 46 collapses it and enables ready removal of forming member 46 from mold cavity 36.

Figure 11:
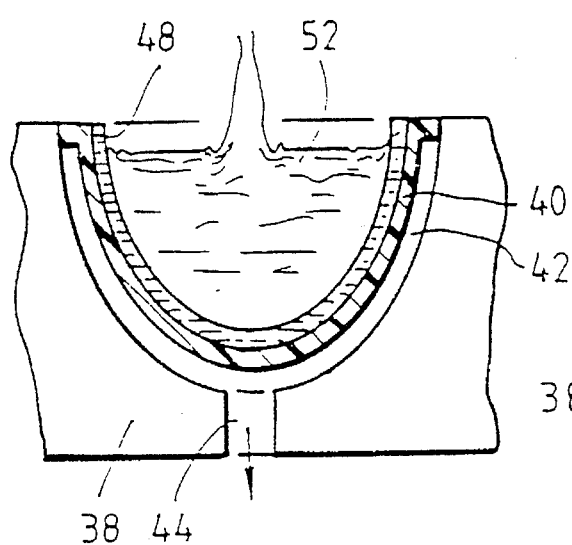
FIGS. 11 and 12 are further embodiments of the invention as illustrated in FIGS. 9 and 1 0, showing the filling of a molded article, and release of the article from the molding cavity.

FIG. 11 illustrates the optional step of the filling of chocolate shell 48 with a filling material 52, for example, ice cream.

Figure 12:
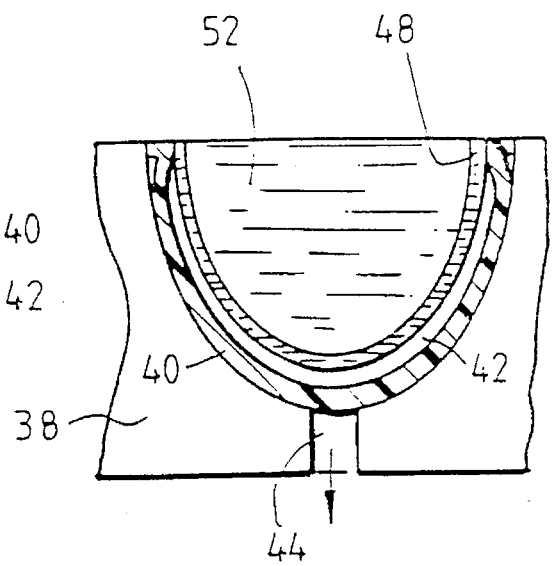

When chocolate shell 48 has been filled to the required level, the air in space 42 is withdrawn gradually through passageway 44 until, as shown in FIG. 12, deformable or collapsible mold surfaces 40 have deformed or collapsed away from a substantial portion of the exterior surface of chocolate shell 48. Continuing to look at FIG. 12 it will be appreciated that continued removal of the air through passage-way 44 will cause the remaining parts of mold surfaces 40 to move away from the chocolate shell 48 whereby to free the filled article from molding cavity 36.

As will be understood by those skilled in the art a plurality of channels may be provided in mold tray 38 where it defines space 42, to allow air to continue to be removed from space 42 after mold surfaces 40 commence moving away from chocolate shell 48 and move up against mold tray 38.

Figure 13:
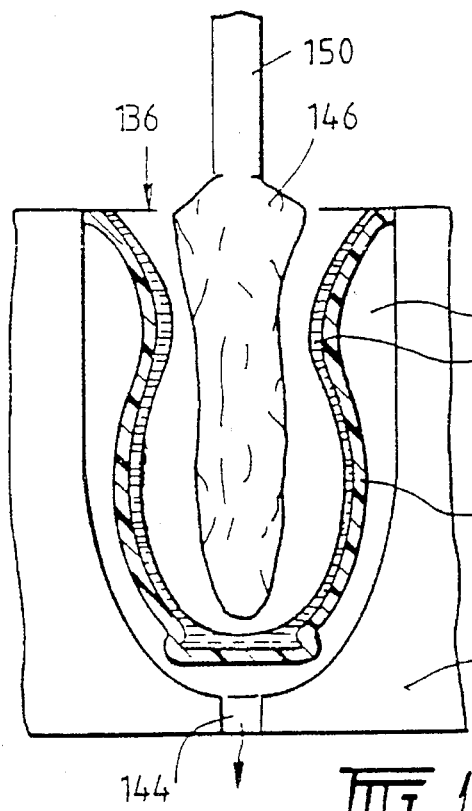
FIGS. 13 and 14 show yet a still further embodiment of the invention by reference to the article of FIGS. 7 and 8, in which a solid mold is used and the mold surfaces are deformable or collapsible thereby to avoid "backlocking" of the molded article in the molding cavity.
Figure 14:
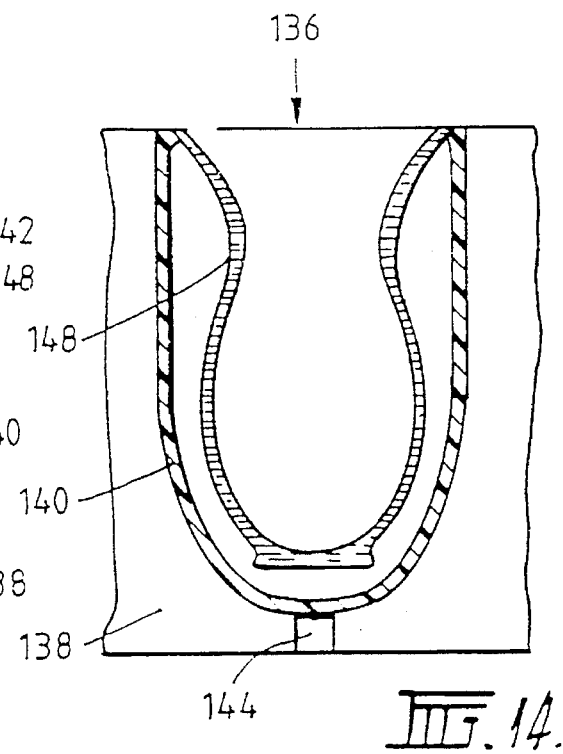

Turning now to FIGS. 13 and 14, there is seen molding tray 138 containing a single molding cavity 136 having mold surfaces 140. FIG. 13 corresponds to FIG. 8, in that the material to be molded, again chocolate, has been formed by collapsible forming member 146 which has now collapsed by virtue of air being withdrawn from the interior thereof through conduit 150. This has left a chocolate shell 148 formed against the mold surfaces 140.

In FIG. 14 it will be seen that following the withdrawal of forming member 146, when air is withdrawn through passageway 144, and from space 142, mold surfaces 140 are caused to move away from the exterior surface of chocolate shell 148, until chocolate shell 148 is clear of mold surfaces 140 and able to be removed from molding cavity 136.

Variations and modifications to the process and apparatus will be apparent to those skilled in the art.

Such modifications include the use of positive pressure either inside the hollow forming members, or, on the outside of the deformable or collapsible mold surfaces of a molding cavity. In such circumstances the article is molded with the positive pressure acting on the deformable or collapsible member, and, once the article is formed, the positive pressure is released which allows the forming member to collapse and/or the mold surfaces to move away from the surface of the molded article.

In the embodiment referred to in FIGS. 1 to 5 and 7 to 14 the positive pressure would be executed by means of greater than atmospheric fluid pressure in the forming member and/or behind the mold surfaces.

Also, depending on the melting temperature of the material being molded, additional heating means or cooling means may be required in the apparatus, and, additional heating or cooling steps may be required in the processes of the invention.

All such modifications and variations are within the scope of the invention.

I claim:

1. A process for producing a molded article having an exterior surface and an interior surface, said process including the following sequential steps:

introducing at atmospheric pressure, sufficient liquid material to form the article into the molding cavity of an open mold wherein the liquid in the mold is maintained at atmospheric pressure throughout the process;

locating a deformable forming member in said molding cavity, said forming member being formed from a flexible material and being positioned in said molding cavity so that the surfaces of the forming member which form the interior surface of said molded article are spaced from the walls of the mold cavity which forms the exterior surface of said molded article, in a predetermined manner, and, in such a way, that said liquid material in said molding cavity is displaced from the bottom of the molding cavity into the space between the surface of the molding cavity and said deformable forming member;

solidifying the liquid material;

deforming the forming member; and removing said deformed forming member from said molding cavity.

2. A process as claimed in claim 1 wherein said forming member is hollow and a partial vacuum is applied to the interior of said forming member to deform the surface thereof away from the molded article prior to removal of said forming member from the mold.

3. A process as claimed in claim 1 wherein said forming member is resiliently deformable.

4. A process as claimed in claim 1 wherein additionally the surfaces of said molding cavity are deformable; said process including the additional step that after the liquid material has solidified and the forming member removed from said molding cavity the surfaces of said mold cavity are deformed away from the exterior surface of said molded article, whereby to allow the molded article to be removed from said mold.

5. Apparatus for producing a molded article having an exterior surface and an interior surface, including:

a mold having an opening and a molding cavity, wherein the opening maintains the molding cavity at atmospheric pressure;

means to introduce sufficient liquid material to produce the molded article into said molding cavity at atmospheric pressure;

a deformable forming member and means to introduce said deformable forming member into said molding cavity so that said liquid material is displaced around said molding cavity;

means to move said deformable forming member while in said molding cavity so that the exterior surface of said deformable forming member which forms the interior surface of said molded article is positioned in a predetermined manner in relationship to the walls of the molding cavity, which forms the external surface of said molded article;

means to deform said deformable forming member after said liquid material has solidified; and means to remove said deformed forming member from said molding cavity.

6. Apparatus as claimed in claim 5 wherein the molding cavity has a surface which is also deformable said apparatus includes means to deform the surfaces of said molding cavity away from the exterior surface of said article after liquid material has solidified.

7. A process as claimed in claim 2 or claim 4, wherein a partial vacuum is applied behind said deformable molding cavity to remove the surface of said molding cavity from the molded article prior to removal from the mold.

8. A process as claimed in claim 1 wherein the material of the molded article is chocolate or a chocolate containing composition.

* * * * *

UNITED STATES PATENT AND TRADEMARK OFFICE
CERTIFICATE OF CORRECTION

PATENT NO. : 5,558,895

DATED : September 24, 1996

INVENTOR(S) : Boyhan

It is certified that error appears in the above-identified patent and that said Letters Patent is hereby corrected as shown below:

Column 1, line 21, delete "Art" and insert -- art--.

Column 1, line 42, delete "greatly," and insert --greatly.--.

Column 4, line 21, delete "1 0" and insert --10--.

Signed and Sealed this

Twenty-fourth Day of June, 1997

Attest:

BRUCE LEHMAN

*Attesting Officer*     *Commissioner of Patents and Trademarks*